Nov. 14, 1950  N. H. JOHNSON ET AL  2,530,365
DOORSTOP AND CATCH ASSEMBLY
Filed June 25, 1948  2 Sheets-Sheet 1
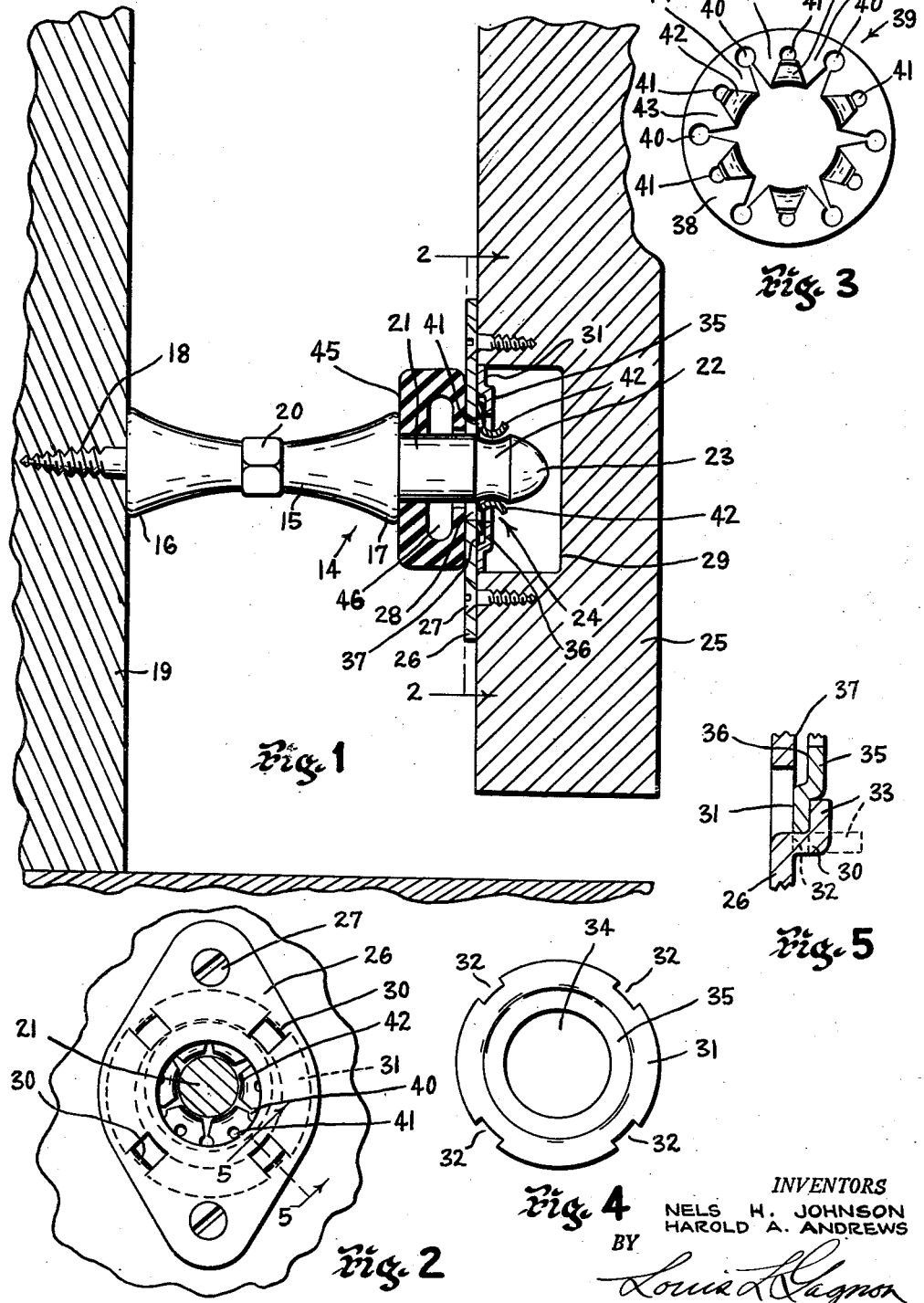
INVENTORS
NELS H. JOHNSON
HAROLD A. ANDREWS
BY
Louis L. Gagnon
ATTORNEY Nov. 14, 1950　　　N. H. JOHNSON ET AL　　　2,530,365
DOORSTOP AND CATCH ASSEMBLY Filed June 25, 1948　　　　　　　　　　　　2 Sheets-Sheet 2

INVENTORS
NELS H. JOHNSON
HAROLD A. ANDREWS
BY
Louis L. Gagnon
ATTORNEY

Patented Nov. 14, 1950

2,530,365

UNITED STATES PATENT OFFICE 2,530,365

DOORSTOP AND CATCH ASSEMBLY

Nels H. Johnson and Harold A. Andrews, Southbridge, Mass.

Application June 25, 1948, Serial No. 35,184

10 Claims. (Cl. 292—17)

1

This invention relates to a combined door stop and catch assembly and has particular reference to simple, efficient and economical means of making same.

One of the principal objects of the invention is to provide a combined door stop and catch assembly of the above character which may be quickly and easily installed, which is simple and positive in its function and which will readily compensate for the expansion or contraction of the wood or other materials from which doors are fabricated and/or for seasonal setting of the house.

Another object is to provide a device of the above character having male and female portions, one adapted to be carried by the door and the other by the baseboard or the like, said female portion embodying a novel sturdy spring clip arrangement floatingly carried by a bumper plate holder or the like and adapted to be self aligning to receive the male portion, with said male portion embodying means for absorbing shock and for limiting its extent of movement inwardly of the female portion.

Another object is to provide a novel, efficient and inexpensive method of forming the spring clip means and of controlling the resultant tension thereof.

Another object is to provide simple and inexpensive means of assembling the parts of the device.

Other objects and advantages of the invention will become apparent from the following description taken in connection with the accompanying drawings and it will be apparent that many changes may be made in the various details of construction, arrangement of parts and methods shown and described without departing from the spirit of the invention as expressed in the accompanying claims. It, therefore, is not desired that the invention be limited to the specific details of construction and arrangement of parts shown and described as the preferred forms only have been given by way of illustration.

Referring to the drawings:

Fig. 1 is a side elevational view, shown partially in section, of a device embodying the invention;

Fig. 2 is a sectional view taken on line 2—2 of Fig. 1 and looking at the front bumper plate in the direction indicated by the arrows;

Fig. 3 is an enlarged face view of the spring clip portion of the device illustrated in Fig. 1;

Fig. 4 is a face view of the back plate portion of the device shown in Fig. 1;

Fig. 5 is an enlarged fragmentary sectional

Figure 6:
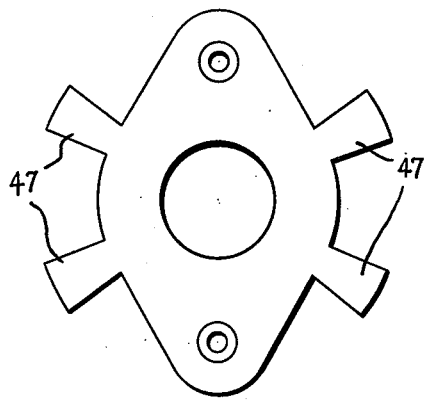
Figure 7:
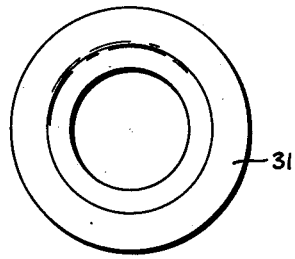
Figure 8:
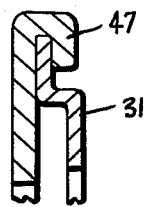
Figure 9:
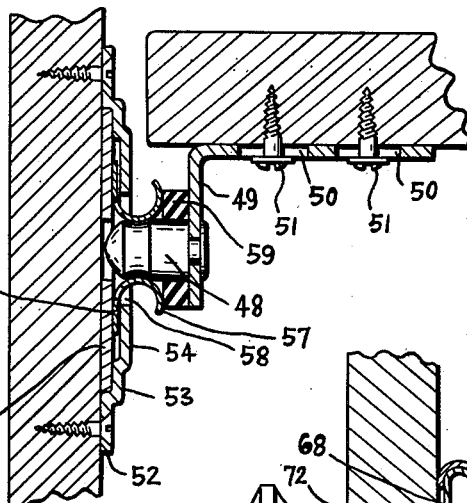
Figure 10:
Figure 11:
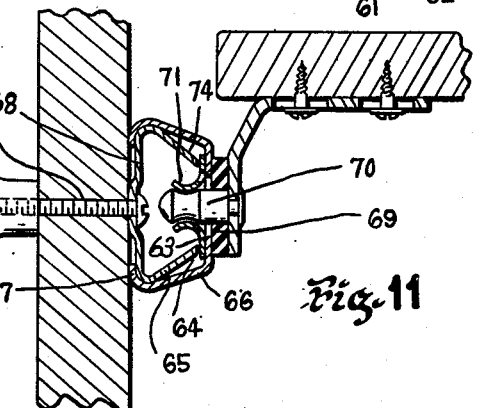
Figure 12:
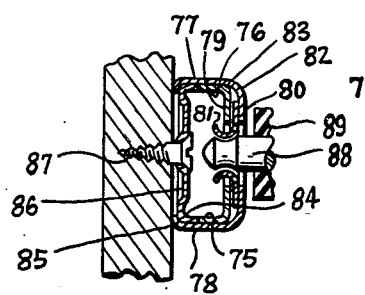

2 view taken as on line 5—5 of Fig. 2 and looking in the direction indicated by the arrows;

Fig. 6 is a face view of a modified form of bumper plate;

Fig. 7 is a rear face view of a back plate portion designed for use with a bumper plate such as shown in Fig. 6;

Fig. 8 is an enlarged fragmentary sectional view, similar to Fig. 5, and illustrating the back plate of Fig. 7 in assembled relation with the bumper plate of Fig. 6;

Fig. 9 is a view generally similar to Fig. 1 and illustrating a further modification of the invention;

Fig. 10 shows a slight modification of male portion such as shown in Fig. 9;

Fig. 11 is a view similar to Fig. 9 illustrating a further modification of the invention; and Fig. 12 is a fragmentary view similar to Fig. 11 illustrating a still further modification of the invention.

Referring more particularly to the drawings wherein like characters of reference designate like parts throughout the various views, one of the devices embodying the invention, as shown in Figures 1 through 5, comprises a member 14, in this instance a door stop, having an intermediate body portion 15 and enlarged shouldered ends 16 and 17. The shouldered end 16 is provided with a screw portion 18 adapted to be forced into the baseboard or the like 19 by providing the intermediate portion 15 with a squared portion 20 which may be engaged by a suitable wrench or the like.

The shouldered end 17 is provided with a reduced male portion 21 having a circumferential groove 22 adjacent its outer end 23. The end 23 is purposely formed relatively pointed and is adapted to function cooperatively with a female portion 24 carried by the door 25.

The female portion 24 comprises a bumper plate 26 secured to the door by screws or the like 27. The plate 26 has a central opening 28 therein and is adapted to overlie a recessed area 29 formed in the door.

The bumper plate 26, as shown in Figures 2 and 5, is formed with a plurality of diametrically spaced integral lugs 30. The lugs are preferably formed by striking them outwardly from the material of the plate 26 as shown best in Fig. 5.

The back plate 31, as shown in Figures 1, 4 and 5, is provided with diametrically opposed peripheral notches 32 of a width controlled so as to snugly receive the respective lugs 30 therein and is attached to the bumper plate 26 by bending the outer portions 33 of said lugs so as to relatively intimately overlie the rear surface of said back plate, as illustrated in Fig. 5.

The back plate 31 has its central area formed with an opening 34 and is annularly dished inwardly, as shown at 35 in Figures 1 and 5, to provide an inner wall 36 spaced substantially parallel with the inner wall 37 of the bumper plate 26. The space between the walls 36 and 37 is such as to loosely receive the annular portion 38 of the female spring clip member 39.

The clip member 39 is preferably formed of flat sheet stock initially shaped to the form of a disc. The disc is placed between conventional double action dies to form the plurality of openings 40 and 41 therein and to shear the fingers 42. The fingers 42 are sheared in such a manner that the sides thereof communicate with the respective spaced openings 40. After shearing, as stated above, the fingers are drawn and curled outwardly, as shown best in Figures 1 and 3, to receive and resiliently fit within the circumferentially grooved portion 22 of the male portion 21.

The openings 41 are formed in the base of the respective fingers 42 to create two spaced legs 43 and 44 for each of said fingers.

The size of opening 41 is controlled according to the resiliency desired of the fingers. It is to be understood that after the spring clip 39 is formed, as set forth above, it is properly treated, in any conventional manner, to introduce the spring action desired. The diameter of the annular portion 38 is controlled to be less than the diameter of the dished portion 35 of the back plate 31 whereby the spring clip member 39 will float freely between said back plate and bumper plate 26 and will be free to move laterally to be self aligning with and to receive the pointed end 23 of the male member 21. This will compensate for any disalignment of the male and female portions which might result from the expansion or contraction of the wood or other material from which doors are formed or from the seasonal setting of the house.

To function as a shock absorber and to also limit the inward movement of the male portion 21 inwardly of the female portion the said male portion is provided with a bumper member 45 preferably formed of rubber or other desirable resilient material. The bumper may be formed solid or may be provided with a central hollowed area 46 if desired.

The device is so constructed as to provide a combined door stop and catch assembly. When the door is opened to its fullest extent the bumper plate 26 will be forced into engagement with the bumper 45 and the male portion 21 will be simultaneously forced into interfitting relation with the floating female spring clip portion 39. This will hold the door in opened position. When it is desired to close the door only a slight outward pull is required to release the female clip portion from the male portion after which the door may be easily swung to closed position.

In Figures 6 through 8 there is shown a slight modification wherein the attachment lugs 47, corresponding to the lugs 30, are formed on the peripheral edge of the bumper plate. In this instance the back plate 31 is not provided with notches 32 but is connected to the bumper plate by merely turning the lugs 47 over the edge of the back plate, as shown in Fig. 8.

In Fig. 9 there is shown a further modification wherein a male portion 48, corresponding to the male portion 21 in Fig. 1, is carried by a bracket 49. The bracket 49 is provided with spaced longitudinally extending slots 50 through which screws or the like 51 may be extended to adjustably secure the bracket to a main support such as a pantry shelf or other similar means. In this instance the female portion embodies a bumper plate 52 having two substantially concentric circular and forwardly dished sections 53 and 54. Section 53 provides a circular seat for receiving the flat back plate 55 and section 54 forms a front wall spaced from the back plate an amount sufficient to floatingly receive the spring clip member 56. The spring clip member is constructed and functions in the same manner as the spring clip 39 of Figures 1 and 3 with the exception that the spring fingers 57 are turned forwardly and extend outwardly of a central opening 58 formed in the dished wall 54. In this instance the fingers are slightly longer than those of Fig. 1 and are provided with a greater curl. The slots 50 provide means for accurately adjusting the male portion 48 to receive the female portion. The male portion 48 is provided with a bumper 59 of rubber or other resilient material.

Fig. 10 shows a further slight modification wherein a male member 60, similar to 48, is provided with a bumper member 61 backed by a disc 62 having a screw member carried thereby for direct attachment to a support.

Fig. 11 shows a still further modification wherein the female resilient portion 63 is loosely fitted and floats between the front edge 64 of a cupped member 65 fitted and held within an outer reversely cupped member 66 by turning the rear edge 67 of said latter cupped member over the base 68 of the first cupped member.

The base of the outer cupped member 66 is provided with an opening 69 through which the male portion 70 extends to interfit with the resilient fingers 71 of the female portion. The base of the inner cupped member 65 is provided with an opening to receive an attachment screw or bolt 72 which, as shown in Fig. 11, also provides means to which a handle member or knob 73 may be attached.

In Fig. 12 there is shown a further slight modification wherein instead of forming the inner cupped member 65 with inwardly and forwardly tapering side walls 74, as shown in Fig. 11, an inner cupped member 75 is shown as having side walls 76 substantially parallel with the side walls 77 of an outer cupped member 78 and as having an inwardly extending perforated base 79 substantially parallel with but spaced from the perforated base 80 of the outer cupped member. In this instance the resilient female member 81 is made to a smaller diameter and floatingly fits between the base portions 79 and 80 with the spacing of said base portions resulting from making the outer cupped member with a curved joining edge 82 of a longer radius than the joining edge 83 of the inner cupped member. A third cupped member 84 reversed with respect to the inner cupped member 75 is also located internally of the outer cupped member 78 and is secured therein and in turn secures the cupped member 75 therein by turning the free edge 85 over the base 86 of said third cupped member. The base 86 has an opening therein through which a connecting screw 87 may be extended. The base 80 of the outer cupped member is provided with a perforation or opening through which the male portion 88 may be extended. The male portion, as in the previous constructions, is provided with a bumper member 89 of rubber or other resilient material.

From the foregoing description it will be seen that efficient and economical means have been provided for accomplishing all of the objects and advantages of the invention.

Having described our invention, we claim:

1. A device of the character described comprising the combination of a male portion having a relatively pointed end and a circumferential groove adjacent said end, a bumper member on said male portion spaced rearwardly of said circumferential groove, a bumper plate, a backing plate carried by said bumper plate, and a member embodying a portion having a central opening therein for receiving said male portion, said member embodying a plurality of spring fingers surrounding said opening, said member being floatingly supported between the bumper plate and the backing plate carried by said bumper plate for free movement in sidewise directions.

2. A device of the character described comprising a male portion embodying a pin-like projection having a relatively pointed end and a circumferential groove adjacent said end, an annular portion of resilient material on said pin-like projection rearwardly of said circumferential groove, a bumper plate, a backing plate carried by said bumper plate, and a female portion for receiving said male portion, said female portion comprising a disc-like member having a central opening therein, a plurality of resilient fingers carrried by said disc-like member and surrounding said opening, said disc-like member being floatingly supported between the bumper plate and the backing plate carried by said bumper plate for free movement in sidewise directions.

3. A device of the character described comprising a member having a screw thread-like portion adjacent one end thereof and a reduced male portion on the opposed end thereof, said male portion having a relatively pointed end and a circumferential groove adjacent said end, a bumper plate, a backing plate carried by said bumper plate, and a member embodying a portion having a central opening therein for receiving said male portion, said member embodying a plurality of spring fingers surrounding said opening, said member being floatingly supported between the bumper plate and the backing plate carried by said bumper plate for free movement in sidewise directions.

4. A device of the character described comprising a member having a screw thread-like portion adjacent one end thereof and a reduced male portion on the opposed end thereof, said male portion having a relatively pointed end and a circumferential groove adjacent said end, a bumper plate, a backing plate carried by said bumper plate, and a female portion for receiving said male portion, said female portion comprising a disc-like member having a central opening therein, a plurality of resilient fingers carried by said disc-like member and surrounding said opening, said disc-like member being floatingly supported between the bumper plate and the backing plate carried by said bumper plate for free movement in sidewise directions.

5. A device of the character described comprising a member having a pin-like projection adjacent one end thereof formed with a relatively pointed end and a circumferential groove adjacent said end, said projection having a resilient ring portion thereon spaced rearwardly of said circumferential groove, a member comprising two superimposed portions, one of said portions having a perforated wall spaced relative to the other of said portions and a disc-like portion floatingly supported between said portions for free movement in sidewise directions, said disc having a central opening therein and a plurality of spring fingers surrounding said opening curling in a sidewise direction and adapted to receive said pin-like projection.

6. A device of the character described comprising a member having a pin-like projection adjacent one end thereof formed with a relatively pointed end and a circumferential groove adjacent said end, said projection having a resilient ring portion thereon spaced rearwardly of said circumferential groove, a pair of superimposed cup-like portions having wall portions in spaced relation with each other and having openings therein and a disc floatingly supported between said wall portions for free movement in sidewise directions and having a central opening therein and a plurality of spring fingers surrounding said opening.

7. A device of the character described comprising a member having a pin-like projection adjacent one end thereof formed with a relatively pointed end and a circumferential groove adjacent said end, said projection having a resilient ring portion thereon spaced rearwardly of said circumferential groove, a pair of superimposed cup-like portions having wall portions in spaced relation with each other and having openings therein and a disc floatingly supported between said wall portions for free movement in sidewise directions and having a central opening therein and a plurality of spring fingers surrounding said opening, one of said cup-like portions having an inturned lip securing said cup-like portion to the other.

8. A device of the character described comprising the combination of a male portion having a relatively pointed end and a circumferential groove adjacent said end, a bumper member on said male portion spaced rearwardly of said circumferential groove, a bumper plate, a backing plate carried by said bumper plate, and a member embodying a portion having a central opening therein for receiving said male portion, said member embodying a plurality of spring fingers surrounding said opening, said member being floatingly supported between the bumper plate and the backing plate carried by said bumper plate for free movement in sidewise directions, one of said plates having a plurality of peripheral notches therein and the other a plurality of projections lying in said notches.

9. A device of the character described comprising an adjustable support, a male portion carried by said support, said male portion having a relatively pointed end and a circumferential groove adjacent said end, a bumper member on said male portion spaced rearwardly of said circumferential groove, a bumper plate, a backing plate carried by said bumper plate, and a member embodying a portion having a central opening therein for receiving said male portion, said member embodying a plurality of spring fingers surrounding said opening, said member being floatingly supported between the bumper plate and the backing plate carried by said bumper plate for free movement in sidewise directions.

10. A device of the character described comprising an adjustable support, a male portion carried by said support, said male portion having a relatively pointed end and a circumferential groove adjacent said end, an annular portion of resilient material on said male portion rearwardly of said circumferential groove, a bumper plate, a backing plate carried by said bumper plate, and a female portion for receiving said male portion, said female portion comprising a disc-like member having a central opening therein, a plurality of resilient fingers carried by said disc-like portion and surrounding said opening, said disc-like member being floatingly supported between the bumper plate and the backing plate carried by said bumper plate for free movement in sidewise directions.

NELS H. JOHNSON.
HAROLD A. ANDREWS.

REFERENCES CITED

The following references are of record in the file of this patent:

UNITED STATES PATENTS

| Number | Name | Date |
|---|---|---|
| 1,127,854 | Belanski | Feb. 9, 1915 |
| 1,224,382 | Isakson | May 1, 1917 |
| 1,550,621 | Lawton | Aug. 18, 1925 |
| 2,085,486 | Villiani | June 29, 1937 |
| 2,389,375 | Lundholm | Nov. 20, 1945 |